3,421,855
PROCESS AND APPARATUS FOR THE AUTOMATIC DETERMINATION AND/OR CONTROL OF THE HYDROXIDE:NITRITE RATIO IN NITRITE SOLUTIONS
Gerrit Kateman, Kurt von Morgen, and Joannes B. G. Wijenberg, Geleen, Netherlands, assignors to Stamicarbon N.V., Heerlen, Netherlands
Filed Dec. 1, 1964, Ser. No. 415,140
Claims priority, application Netherlands, Dec. 2, 1963, 301,241
U.S. Cl. 23—230    11 Claims
Int. Cl. G01n 31/16

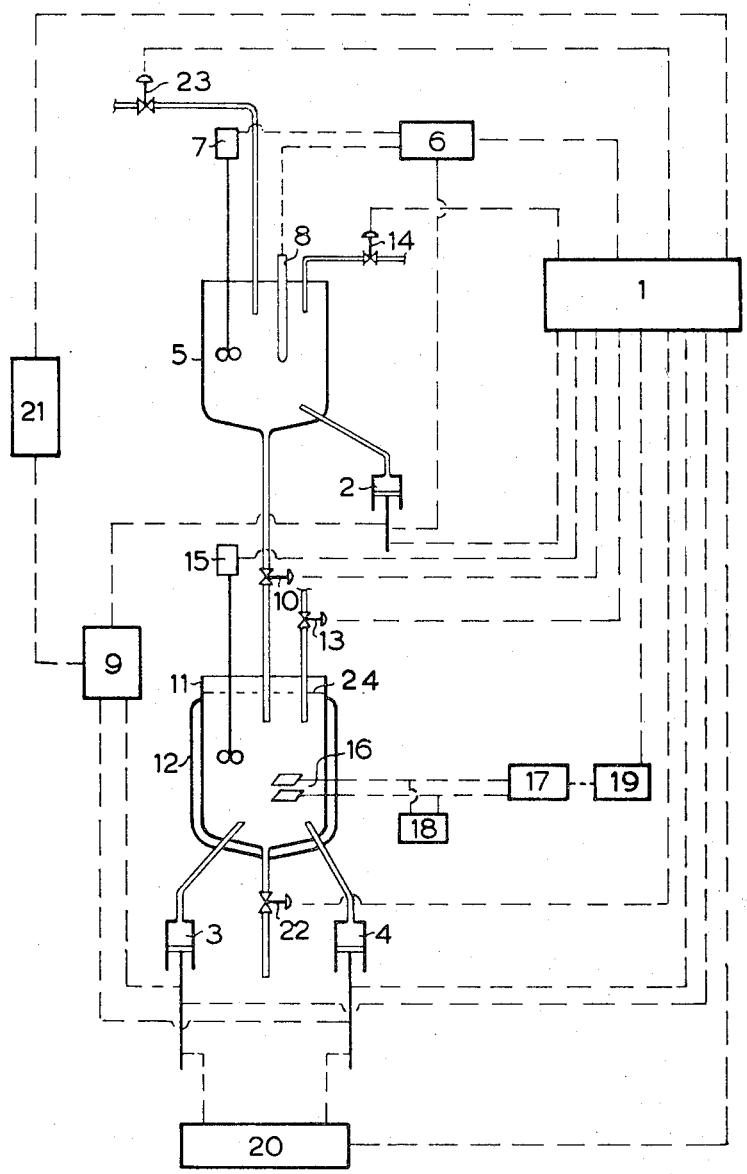

ABSTRACT OF THE DISCLOSURE

Process and apparatus for the automatic determination of the hydroxide:nitrite ratio in a nitrite solution wherein the sample undergoes an automatic preliminary titration until pH~5 is reached; the sample is then automatically transferred to a second titration vessel, heated, and the pH is lowered to 2.0–3.5; and the sample undergoes an automatic final titration with either amidosulfuric acid or a nitrite solution, depending on whether the sample contains an excess of said acid or said nitrite.

---

The invention relates to a process for the automatic determination of the hydroxide:nitrite ratio in nitrite solutions.

The preparation of hydroxylamine (one of the starting materials for caprolactam) normally starts from an ammonium nitrite solution prepared by allowing nitrous gases to act on an ammonium carbonate solution. Such an ammonium nitrite solution contains ammonium carbonate and/or ammonium bicarbonate in addition to ammonium nitrite and some ammonium nitrate. The ammonium carbonate and/or ammonium bicarbonate can be titrated with acid and in this operation these substances behave in the same way as ammonium hydroxide. For convenience, the value thus determined is called the hydroxide content of the nitrite solution.

The hydroxide:nitrite molar ratio in industrial ammonium nitrite solutions is normally smaller than 1. For the preparation of hydroxylamine, however, this ratio should preferably be approximately equal to 1. Therefore, ammonium hydroxide is added to the ammonium nitrite solution to bring the ratio to the desired value. This addition is usually carried out discontinuously. A sample of the ammonium nitrite solution is analyzed and, depending on the result of the analysis, an amount of ammonium hydroxide is added to the ammonium nitrite solution. After that, the mixture is re-analyzed for the purpose of verification, and a correction is made if necessary.

The discontinuous procedure described above for adding the necessary amount of ammonium hydroxide suffers from several disadvantages. For example, the procedure is too cumbersome for use in the large-scale production of hydroxylamine. Moreover, the process requires considerable additional tank volume.

The present invention has as its principal object the elimination of the prior art problems mentioned above. More particularly, the invention herein provides a process for the automatic determination of the hydroxide:nitrite ratio in nitrite solution whereby a large number of analyses may be run in a short time. This makes possible a considerable saving in labor and time. In addition, the necessary mixing operation is controlled automatically in a simple manner.

The process of the present invention is characterized by the fact that a sample of the solution to be analyzed is fed to a first titration vessel and automatically titrated with an amidosulphuric acid solution until the equivalence point (pH~5) is reached, after which the solution is automatically transferred to a second titration vessel where the sample is heated to 30–80° C., the pH is lowered to 2.0–3.5 by addition of, for example, dilute sulphuric acid and, after a waiting time of at least half a minute has elapsed, the reaction mixture is automatically and slowly titrated further with an amidosulphuric acid solution, or a nitrate solution, depending on whether the reaction mixture contains a deficient amount or an excess of amidosulphuric acid in relation to the amount of nitrite. In this last-mentioned titration, the choice of the standard solution and the end point are determined voltametrically, whereupon the results of the 1st and the 2nd titration are converted to hydroxide:nitrite ratio. The term "voltametrically" as used herein is intended to mean potentiometrically with a superposed constant current or biamperometrically.

Amidosulphuric acid contains positively charged H-ions, which impart to it the character of a strong acid, and a negatively charged $NH_2SO_3$-ion which, at pH values below 3.5, reacts with nitrite according to he equation:

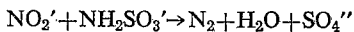

In the first titration the hydroxide is titrated with amidosulphuric acid to an equivalence point where the pH is ~5. The pH can be measured by means of a glass-calomel electrode system in which the amidosulphuric acid is preferably supplied along the glass electrode to achieve greater accuracy.

It is preferred, after the treated sample has been supplied from the first titration vessel to the second titration vessel, to automatically supply an amount of water to the empty first titration vessel to prevent the electrode from drying up. Then, an amount of acid, e.g., 0.5 N sulphuric acid, is supplied to the sample in the second titration vessel, to lower the pH to 2.0–3.5. The amido group of the amidosulphuric acid already present now reacts with the nitrite according to the above reaction equation, the reaction proceeding sufficiently fast at a temperature between 30 and 80° C. for effective results. However, it is preferred to lower the pH to 2.1 and to bring the temperature of the reaction mixture to 60° C. to achieve not only a sufficiently fast reaction rate but also good accuracy. After a waiting time of at least half a minute, the reaction between the nitrite and the amidosulphuric acid has terminated, and the potential difference or the current between two electrodes in the reaction mixture is compared with a reference value chosen on the basis of the titration curve. From this comparison, it can be determined whether an excess or deficient amount of amidosulphuric acid is present in relation to the amount of nitrite. Good results are obtained for this purpose by using two identical platinum electrodes and by employing a superposed constant current of 10 microamperes per cm.$^2$ of electrodes area in the potentiometric indication.

If the reaction mixture in the second titration vessel contains a deficient amount of amidosulphuric acid in relation to the amount of nitrite, the nitrite is slowly titrated with the amidosulphuric acid until the reference value is reached. In this case, the required hydroxide:nitrite ratio now equals:

$$\frac{a}{a+b}$$

where $a$ represents the number of cm.$^3$ of amidosulphuric acid consumed in the first titration and $b$ the number of cm.$^3$ of amidosulphuric acid consumed in the second titration.

If there appears to be an excess of amidosulphuric acid in relation to the amount of nitrite, the excess is titrated back with a nitrite solution, e.g., a sodium nitrite solution. The hydroxide:nitrite ratio now equals $$\frac{a \cdot t_1}{a \cdot t_1 - c \cdot t_2}$$

where $c$ represents the number of cm.³ of nitrite solution consumed in the back titration, $t_2$ is the titre of the nitrite solution and $t_1$ the titre of the amidosulphuric acid. The titre of the nitrite solution is preferably taken equal to the titre of the amidosulphuric acid, with the result that the required ratio becomes equal to $$\frac{a}{a-c}$$

Although the invention is primarily important for the preparation of hydroxylamine from an ammonium nitrite solution, the process may also be employed for determining the hydroxide:nitrite ratio in other nitrite solutions, e.g., in a sodium nitrite solution which, in addition to sodium nitrite and sodium nitrate, contains sodium hydroxide and/or sodium carbonate.

For automatically controlling the hydroxide:nitrite ratio when using the process according to the invention, a sample of the nitrite solution should be taken automatically, after which the sample is analyzed automatically and the result of the analysis is used as a measuring datum in the control circuit. When mixing a nitrite solution with, for example, ammonia liquor to prepare a nitrite solution of a given hydroxide:nitrite ratio, the sample can be taken from the mixture and, the nitrite flow being constant, the flow of ammonia liquor can be controlled. The flow of ammonia liquor can also be controlled in dependence on an analysis of a sample from the nitrite flow which has not yet been mixed with the flow of ammonia liquor. There are several possibilities for automatically controlling the hydroxide:nitrite ratio according to known procedures by means of the measuring datum obtained by the process of the invention.

If it is desired to obtain a nitrite solution with a molar hydroxide:nitrite ratio of approximately 1:1 by automatically controlling the mixing of a nitrite solution in which the aforementioned ratio is lower than unity with, for example, ammonia liquor, it suffices to add the amidosulphuric acid to a sample of the mixture in the first titration vessel, and to employ the measured potential difference, or the measured current intensity, between the electrodes in the reaction mixture in the second titration vessel as a measuring datum for controlling the mixing operation. The second titration is then no longer needed for control purposes.

The invention also provides a device for the automatic determination and/or control of the hydroxide:nitrite ratio. The device comprises a first titration vessel provided with a pH-electrode system and a discharge pipe including a shut-off element, a second titration vessel provided with a heating source, a discharge pipe with shut-off element, a voltametric indication system, an acid-metering device, a memory and a command circuit.

Preferably, the installation comprises a water-feeding device which has a supply line leading to the first titration vessel. To protect the electrode in the first titration vessel against drying-up, the device may be used for automatically supplying an amount of water to the vessel after the sample has been transferred from it to the second titration vessel.

To reduce the time needed for the analysis as much as possible, it is preferred to construct the command circuit as a sequence circuit. In this way, unnecessary waiting times may be avoided since the termination of one period may be used to provide the starting signal for the following period.

The invention is further described with reference to the attached schematic drawing. This drawing illustrates the principal features of the invention but is not intended to limit the scope or application thereof in any way.

Referring more particularly to the drawing, a command circuit for the automatic execution of the various operations is designated by the reference numeral 1. At the start of an analysis cycle, the command circuit transmits a signal to the motor burettes 2, 3 and 4. This causes the burettes to be filled insofar as titration liquid has been withdrawn from them in a previous cycle. Each motor burette is provided with a supply and discharge valve which, for simplicity, are not shown in the drawing. As will be shown later, the first titration vessel 5 already contains a sample mixed with some water. After the command circuit has noted that all burettes are filled, the circuit transmits a starting signal to titrator 6 which, subsequently, starts stirrer 7 and burette 2. The sample in measuring vessel 5 is now titrated with amidosulphuric acid from burette 2 until the pH of the sample, as measured with electrode 8 of an electrode system, has reached a previously set value. The consumption of amidosulphuric acid is passed on to computer circuit 9.

Next, titrator 6 stops stirrer 7 and transmits a signal to command circuit 1 to indicate that the titration has terminated. This command circuit transmits a signal to valve 10 as a result of which the valve is opened for an adjustable length of time and the liquid flows from titration vessel 5 into titration vessel 11. In the latter vessel the liquid is brought to the desired temperature by means of heating jacket 12. After valve 10 has closed, command circuit 1 transmits a signal to valve 13 and valve 14, with the result that valve 13 admits a given amount of acid into titration vessel 11, and valve 14 admits a given amount of water to titration vessel 5 to protect electrode 8 against drying up. Next, command circuit 1 starts stirrer 15 and, after an adjustable period of, for example, 1 minute has elapsed, the potential difference between the two identical electrodes 16 is measured with valve voltmeter 17, in which operation an electric current is passed through the measuring circuit by the constant current source 18, and the measured potential difference is compared with reference potential in the trigger circuit 19.

The result of this comparison is passed on to the command circuit 1 which then transmits a titration signal via pulsation equipment 20 to burette 3 or 4 commanding it to execute a titration with either amidosulphuric acid or nitrate solution depending on whether the reaction mixture in the titration vessel 11 contains an excess or a deficient amount of amidosulphuric acid in relation to the amount of nitrite. Pulsation apparatus 20 controls the intermittent addition of the standard solution in small portions. To keep the liquid in the titration vessel 11 from splashing as a result of the reaction, the vessel 11 is provided with a piece of gauze 24. When the potential difference between the electrodes 16 is substantially equal to the reference potential, the command circuit transmits the stopping signal to burette 3 or 4 and stirrer 15. The consumption of standard solution from burette 3 or 4 is passed on to the computer circuit 9. Command circuit 1 now cuts in memory 21, which receives the result of the calculation in computer circuit 9 and commands the valves 22 and 23, as a result of which the valves are opened for an adjustable length of time. The liquid in titration vessel 11 is now discharged while a new sample from an automatic sampling apparatus (not shown) is admitted to titration vessel 5 via the opened valve 23, after which a new cycle can be started.

On behalf of the automatic control of the hydroxide: nitrite ratio, the proportional number received by memory 21 is fed, as a measuring datum, to the control circuit (not shown).

If, in the case of automatic control, no second titration is carried out, the potential difference measured between the electrodes 16 is, after a short waiting interval, transmitted to memory 21 via trigger circuit 19, to be used as a measuring datum in the control operation. The burettes 3 and 4, the pulsation apparatus 20 and the computer circuit 9 can then be omitted, while the burette 2 can be replaced by a vessel which is fitted with a valve operated by the titrator 6.

It will be recognized that various modifications may be made in the invention described herein without deviating from the spirit and intent thereof as defined in the following claims wherein we claim:

1. A process for the automatic determination of the hydroxide:nitrite ratio in a nitrite solution comprising the steps of feeding a sample of the solution to be analyzed to a first titration vessel and automatically titrating the same with an amidosulphuric acid solution until the equivalence point of pH~5 is reached, thereafter automatically transferring the resulting solution to a second titration vessel, heating the sample in said second titration vessel to 30–80° C. and lowering the pH to 2.0–3.5, allowing the sample to wait for at least half a minute, then automatically and slowly titrating further with a standard solution selected from the group consisting of an amidosulphuric acid solution and a nitrite solution, the former being selected if the solution to be titrated contains an excess of nitrite with respect to amidosulphuric acid, as determined voltametrically, and the latter being selected if the solution to be titrated contains an excess of amidosulphuric acid with respect to the nitrite, as determined voltametrically, determining the endpoint voltametrically and converting the results of the first and second titrations to the hydroxides:nitrite ratio.

2. Process according to claim 1 which includes using a glass-calomel electrode system in the first titration and supplying amidosulphuric acid solution along the glass electrode.

3. Process according to claim 1 wherein an amount of water is automatically supplied to the empty first titration vessel after the solution has been transferred from the first to the second titration vessel.

4. Process according to claim 1 wherein the solution in the second titration vessel is brought to a temperature of about 60° C. and the pH of the solution is lowered to about 2.1.

5. Process according to claim 1 wherein two identical platinum electrodes are used in the second titration vessel and a constant superposed current of 10 microamperes per $cm.^2$ of electrode area is used for the potentiometric indication.

6. Process according to claim 1 wherein the titre of the nitrite solution used for titrating in the second titration vessel has substantially the same titre as the amidosulphuric acid.

7. Process for automatically controlling the mixing of a nitrite solution with ammonia liquor in the preparation of a nitrite solution with a given hydroxide:nitrite ratio, comprising the steps of claim 1 and further employing this determination by sending it to a control circuit, said control circuit determining the amount of ammonia liquor to be mixed with said nitrite solution.

8. Apparatus for automatically determining the hydroxide:nitrite ratio in nitrite solutions comprising:
   (a) a first automatic titration vessel provided with a pH electrode system, a discharge pipe with a controllable shutoff element, and a nitrite solution sample inlet pipe with a controllable shutoff element,
   (b) the second automatic titration vessel provided with a voltametric indication system, a heating source, and a discharge pipe with a controllable shutoff element, said second automatic titration vessel connected to the discharge pipe of the first automatic titration vessel,
   (c) a controllable acid feeding device connected to said second titration vessel,
   (d) a command circuit connected to the automatic titration vessels, the shutoff elements, and the acid feeding device to control the operation of the discharge pipes, the pH electrode system, the voltametric indication system and the acid feeding device,
   (e) a computer circuit connected to the automatic titration vessels, and
   (f) a memory circuit connected to the computer circuit and the command circuit, said memory circuit activated by the said command circuit to receive data from said computer circuit.

9. Apparatus according to claim 8, additionally including a water feeding device provided with a discharge pipe to the first automatic titration vessel, said discharge pipe having a controllable shutoff element connected to the command circuit.

10. Apparatus according to claim 8 wherein the command circuit is a sequence circuit.

11. Apparatus for automatically determining the hydroxide:nitrite ratio in nitrite solutions comprising first automatic titration means to titrate a sample of nitrite solution, second automatic titration means including a voltametric indication system and connected to said first automatic titration means to receive the titrated nitrite solution from said first automatic titration means, said second titration means including means to titrate said sample with one of at least two solutions, a command circuit means for controlling the flow of said sample, the voltametric indication system, and the flow of the titrating solutions, memory circuit means connected to the command circuit means and capable of being activated by said command circuit means, and a computer circuit means for sending data to said memory circuit means.

References Cited

UNITED STATES PATENTS

| | | | |
|---|---|---|---|
| 2,650,256 | 8/1953 | Lingane | 23—253 |
| 3,073,682 | 1/1963 | Lindsley | 23—230 |
| 3,157,471 | 11/1964 | Harrison | 23—253 |
| 3,276,843 | 10/1966 | Cooper | 23—230 |
| 3,294,662 | 12/1966 | Matlow | 204—195 |

OTHER REFERENCES

Brasted, R. C., Analytical Chemistry, vol. 24, pp. 1111-1114 (1952).

Young, P., Analytical Chemistry, vol. 24, p. 159 (1952).

Mellor, Comprehensive Treatise on Inorganic and Theoretical Chemistry, vol. 8, p. 637 (1928).

MORRIS O. WOLK, *Primary Examiner.*

ELLIOTT A. KATZ, *Assistant Examiner.*

U.S. Cl. X.R.

23—253; 204—1, 195